United States Patent [19]

James

[11] Patent Number: 5,483,949
[45] Date of Patent: Jan. 16, 1996

[54] EXOTHERMIC COMPOSITIONS AND CONTAINER FOR HEATING FOOD

[76] Inventor: Dean B. James, 20518 Deerpark Ct., Saratoga, Calif. 95070

[21] Appl. No.: 311,134

[22] Filed: Sep. 22, 1994

[51] Int. Cl.⁶ ............................................. F24J 1/00
[52] U.S. Cl. ........................ 126/263.05; 126/263.01; 126/263.06; 126/263.08
[58] Field of Search .................. 126/263 D, 263 DA, 126/263 DB, 263 DC, 263 A–263 DD, 263.05, 263.06, 263.08, 263.01; 44/3 R

[56] References Cited

U.S. PATENT DOCUMENTS

| | | | |
|---|---|---|---|
| 2,968,932 | 1/1961 | Vance et al. | 126/263 DB |
| 3,429,672 | 2/1969 | Young | 126/263 E X |
| 3,871,357 | 3/1975 | Grosso et al. | 126/263 |
| 4,002,235 | 1/1977 | Donnelly | 126/263 |
| 4,265,216 | 5/1981 | Marshall et al. | 126/263 |
| 4,501,259 | 2/1985 | Apellaniz | 126/263 |
| 4,748,035 | 5/1988 | Apellaniz | 126/263 D X |
| 4,867,131 | 9/1989 | van der Merwe et al. | 126/263 |

*Primary Examiner*—Larry Jones

[57] ABSTRACT

An exothermically hydrated fuel for a self-heating food container comprises particles of a hard quicklime that has been calcined at a temperature above 1,400° C., such as from 1,410° C. to 1,500° C. The fuel can also contain at least 10% based on the weight of the hard particles of softer, more porous particles of quicklime calcined at a temperature above 1,250° C. and/or particles of an anhydrous acid that exothermically reacts with quicklime to form a non-toxic, non-hazardous salt such as oxalic acid.

16 Claims, 6 Drawing Sheets

Figure 1:
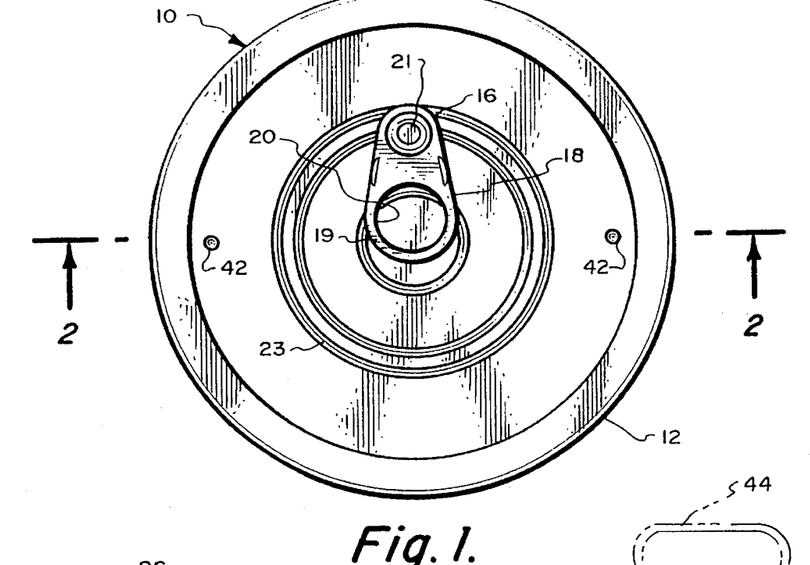
FIG. 1 is a top plan view of a food container in accordance with the invention.

FIG. 7 ously pulled by hand by means of a ring 33 placed on the top 31 of the outer container 12 (FIG. 1).

EXOTHERMIC COMPOSITIONS AND CONTAINER FOR HEATING FOOD

TECHNICAL FIELD

The present invention relates to exothermic compositions for warming a sealed food container and, more particularly, to a dry composition that has long shelf life and generates heat on contact with water.

BACKGROUND OF THE INVENTION

There is a demand for meal packages that include a heating medium. These meals can be used by hikers, climbers, forest fire fighting crews, etc. The largest demand is for tasty, convenient meals for military personnel to carry while in action on maneuvers. The self-contained heat source eliminates the necessity to carry stoves and fuel, and the meal can be heated without a hot fire or flame which can be easily detected by infra-red detectors by the enemy.

The most widely used heating medium is based on the reaction of quicklime and water. However, in order to provide an optimum package, weight and cost are principal considerations. Also important is the ability to heat the food without causing overboiling and spattering of the lime-water reaction mixture which can be a hazard to the user or can contaminate the food.

STATEMENT OF THE PRIOR ART

There are many possible configurations for the container such as a tray as disclosed in U.S. Pat. No. 4,771,761. The most popular form of heatable food container is a can-in-can form of product in which the inner sealed can contains the food and the outer annulus between the two cans contains two compartments separated by a pierceable membrane. One compartment contains the hydratable lime and the other contains water.

U.S. Pat. No. 4,501,259 to Apellaniz teaches a food container in which the reactivity of the quicklime has been reduced by calcining the quicklime at a temperature from 1,100° C. to 1,400° C. Apellaniz utilizes an excess of water. The amount of water is from 0.75 to 3.0 parts by weight per part by weight of the quicklime. The excess water results in a milky, alkaline, hot residue which can leak out the puncture holes and become a hazard to the user. Apellaniz in a later patent (U.S. Pat. No. 4,748,035) teaches that slow reacting, overburnt lime (calcined above 1150° C.) can be used if 6–75 percent of a high or medium-reactivity quicklime is added, preferably from 12 to 50 percent by weight of the high- or medium-reactivity softburnt quicklime, i.e. quicklime burned at a temperature from 900° to 1,150° C. to a porous condition. The grain size is usually 2–5 mm. The overburnt limes exemplified were calcined at 1,200° C. for four hours. Again an excess amount of water was used to provide the slaking reaction.

STATEMENT OF THE INVENTION

It has now been discovered in accordance with the invention that even-heating, long shelf-life, self-heatable food containers can be provided in which the lime portion of the fuel is completely overburnt lime calcined at a temperature above 1,150° C. and even above a temperature of 1,400° C. The mixture of overburnt lime and water heats the food in acceptable time in a safe and efficient manner. The quicklime-water fuels of the invention generate heat in a controlled and sustained manner for a period of time sufficient to warm the food in the inner container without the hazards of flame, boilover, explosion, alkalinity, or toxicity. Another aspect of the invention is the reduction of the amount of water such that only a dry residue results after the exothermic reaction. A further aspect of the invention is to add an acid to the fuel mixture that exothermically reacts with the lime to produce heat and a neutral (non-alkaline) residue.

DETAILED DESCRIPTION OF THE INVENTION

Figure 2:
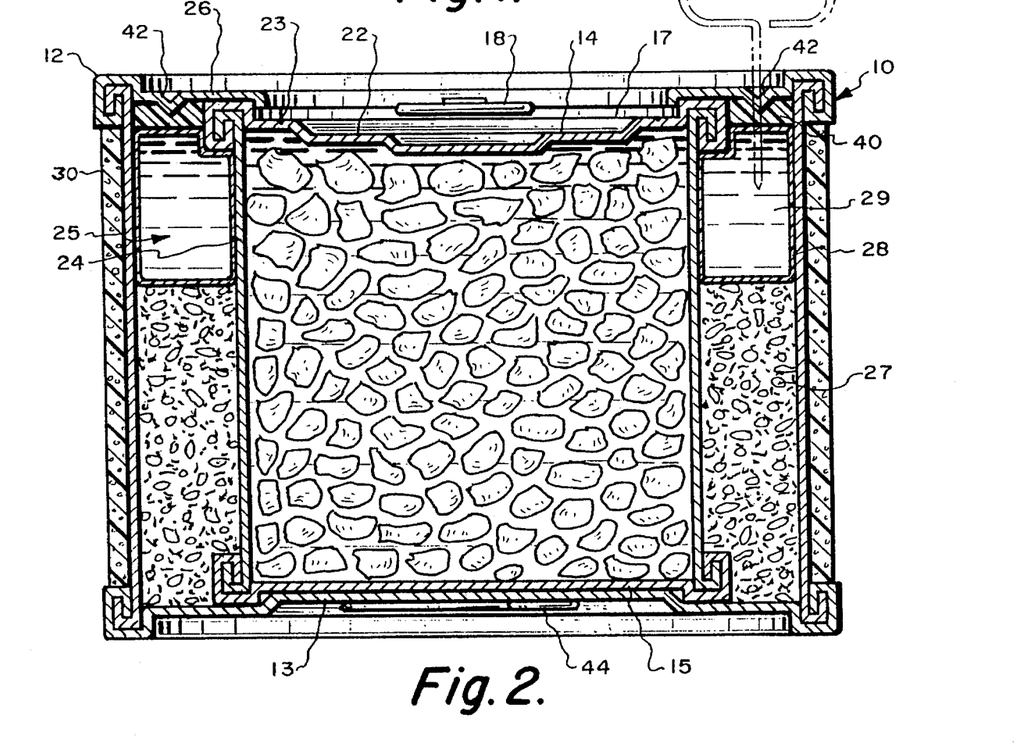
FIG. 2 is a view in section taken along line 2—2 of FIG. 1.

Referring now to FIGS. 1 and 2, a tightly closed cylindrical can 10, contains the food to be heated before its consumption. The food can 10 is placed in an outer container 12 having the shape of a cylindrical can. The outer container 12 has a closed bottom 13 and is open at its opposite end 14. The outer container 12 is coaxial with the food can 10, the bottom 15 of which is centered on the bottom 13 of the outer can 12 by means of a centering ring 16. The top 17 of the food can 10 is provided with an opening device 18 on the lid 22 which closes the top of the can 10. This device 18 can comprise a tongue 19 provided with an eyelet 20 and with a tab 21 that is attached to the lid 22. When the tongue 19 is pulled by hand, the lid 22 of the food can 10 tears along a circular line of small resistance shown by the thinned line 23 of the lid 22. The food can 10 may be opened by means of this known device 18, without the need of using a special opening tool.

A closed, annular chamber 25 is formed between the outer container 12 and the side wall 24 of the food can 10. The chamber 25 is closed on the side adjacent to the top end 17 of the food can 10, by an annular strip or ring 26 that is made of an easily pierceable material, such as thin metal sheet or a plastic sheet such as polyethylene or polyester. One edge of the annular ring 26 is crimped to the free edge (opposite the closed bottom 13) of the container 12, whereas the other edge of the annular strip 26 is also crimped to the end of the side wall 24 of the inner food can 10 that is adjacent to its top end 17. The annular strip 26 tightly closes the annular chamber 25 that contains the reactants necessary for the exothermic reaction used for heating the contents of food can 10. An annular plastic ring 40 may be disposed below the annular strip 26 to further ensure sealing of the annular chamber 25.

The overburned particles 27 of lime are placed in the lower part of the annular chamber 25. A torus shaped bag 28 is disposed in the upper portion of the annular chamber 25 above the particles 27. The bag 28 can be made of a water-vapor impermeable, very flexible plastic such as, for example, polyethylene. The flexible bag 28 contains water 29 under slight pressure. When a pointed tool, such as a spike 44, is pushed through thinned metal ports 42 in the metal ring 26 and the underlying plastic ring 40, the bag is pierced, the water is expelled from the bag 28 and flows and distributes quickly, by gravity, into the solid reactant particles 27 located under the bag 28 and initiates the exothermic reaction uniformly across the body of the particles 27. The outer face of the outer container 12 can be provided with a heat-insulating layer 30 such as polystyrene foam and can be decorated with the product label. The spike tool 44 can be attached to the bottom of the can-in-can product.

It has been discovered in accordance with the invention that the temperature at which calcium carbonate is calcined, though important, is not the only parameter controlling the reactivity of overburnt lime. The reactivity of the overburnt lime is also influenced by the type of kiln used to calcine the limestone and also the retention time of the limestone in the kiln. The physical nature of the limestone also influences the properties of the calcined product. Calcite limestones have a rhombohedral crystal structure and are soft, having a Moh hardness of about 3 and a specific gravity of about 2.72 g/cm$^3$. Aragonite limestones are more dense (specific gravity of about 2.94 g/cm$^3$) harder (3.5 to 4.0 Mohs) and have an ortho-rhombic structure.

Rotary kilns and parallel flow regenerative kilns usually produce soft burned, highly reactive limes. Rotary kilns with a small feed size generally produce a somewhat harder burned lime while counterflow, shaft kilns units produce the hardest burned limes.

The hardest burned limes have the highest compressive strength and the best resistance to abrasion during handling and storage. Therefore, there will be less physical change in the quicklime fuel when hard burned limes are packaged in the annular chamber.

Samples of quicklimes overburned at temperatures above 1,200° C. had the following properties:

TABLE 1

| SAMPLE | SOURCE | CALCINATION TEMPERATURE °F. | °C. | PROPERTIES |
| --- | --- | --- | --- | --- |
| 1 | Exshaw, Alberta | 2329 | 1276 | Soft, Chalky |
| 2 | Pavillion, B.C. | 2350 | 1288 | Hard, Dense |
| 3 | Exshaw, Alberta | 2542 | 1394 | Soft, Chalky |
| 4 | Faulkner, Manitoba | 2600 | 1427 | Hard, Dense |
| 5 | Exshaw, Alberta | 2621 | 1438 | Soft, Chalky |

All the samples as received were acorn-to-walnut size particles. The Exshaw materials are soft, chalky, more porous and had a lower density. They crumbled when hit with a hammer. The harder, denser Pavillion and Faulkner materials shattered when hit with a hammer. All materials were crushed to "Grape-nuts" sized particles about 1–4 mm in diameter.

EXAMPLE 1

Figure 3:
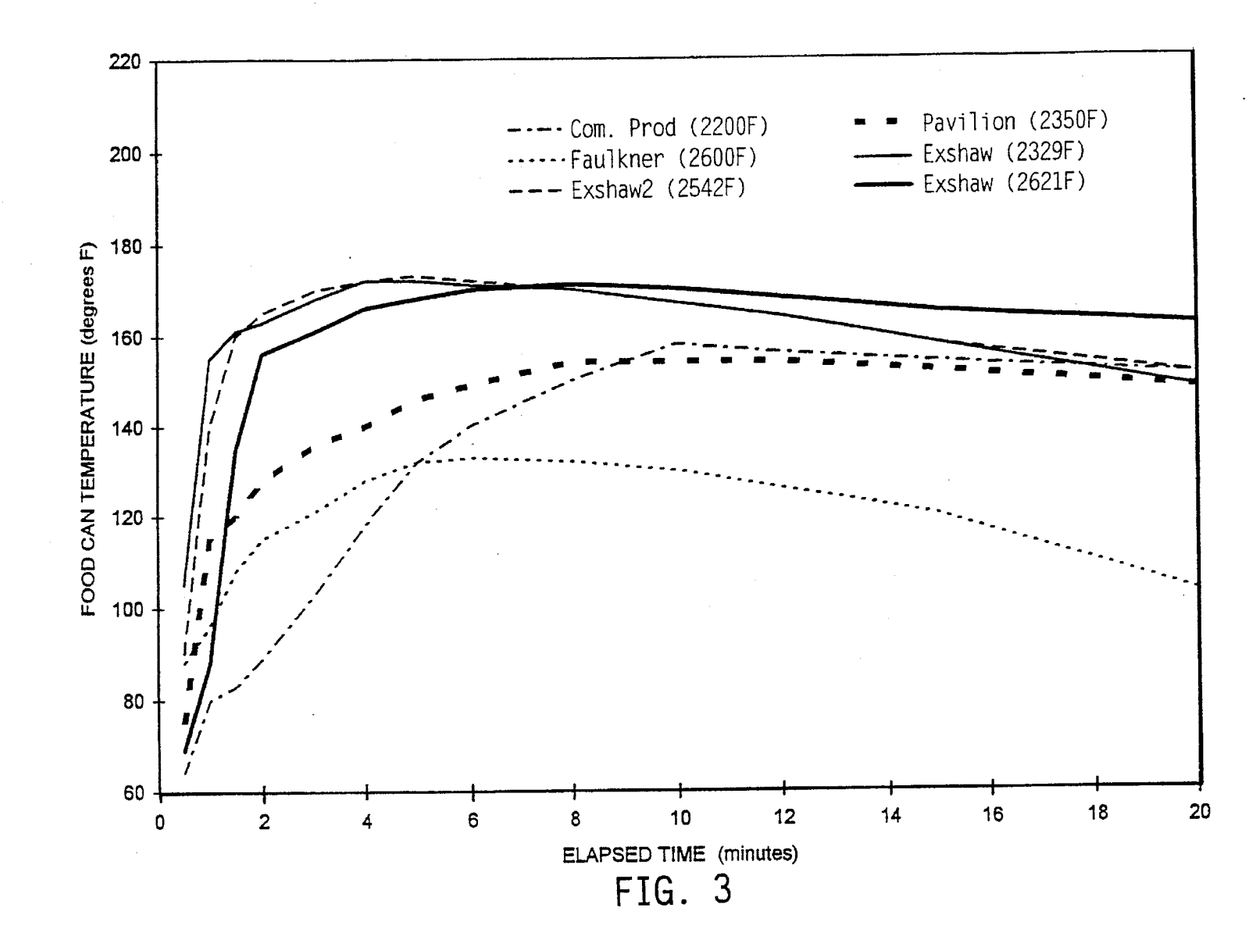
FIG. 3 is a set of curves of temperature change versus time of the temperature of water (simulating the food) contained in an inner can with a medium burned-lime (Example 1) and one of 5 highly overburned limes (Example 2, Samples 1 through 5) in the annular chamber.

A self-heating can-in-can similar to the device shown in FIGS. 1 and 2 was utilized in a series of experiments. The outer annulus contained 100±5 g. of water and 155±5 g. of the lime in a commercial food can product. This lime is believed to have been calcined at about 1,200° C. (2,200° F.). The particles were about 1–4 mm in diameter. The water-to-lime ratio is 0.67. The inner can contained 370 grams of water to simulate food. The container and fuel mixture of Example 1 was tested to provide a basis for comparison of heating performance. The results are shown in FIG. 3.

EXAMPLE 2

The quicklime in the can-in-can container of Example 1 was replaced with the same amount of same-sized particles of Samples 1–5 of the highly overburned quicklimes of Example 2. The amount of water and the water-to-lime ratio were the same as Example 1. The containers and the fuel mixture of Example 2 were also tested for heating performance. Results are also shown in FIG. 3.

Figure 4:
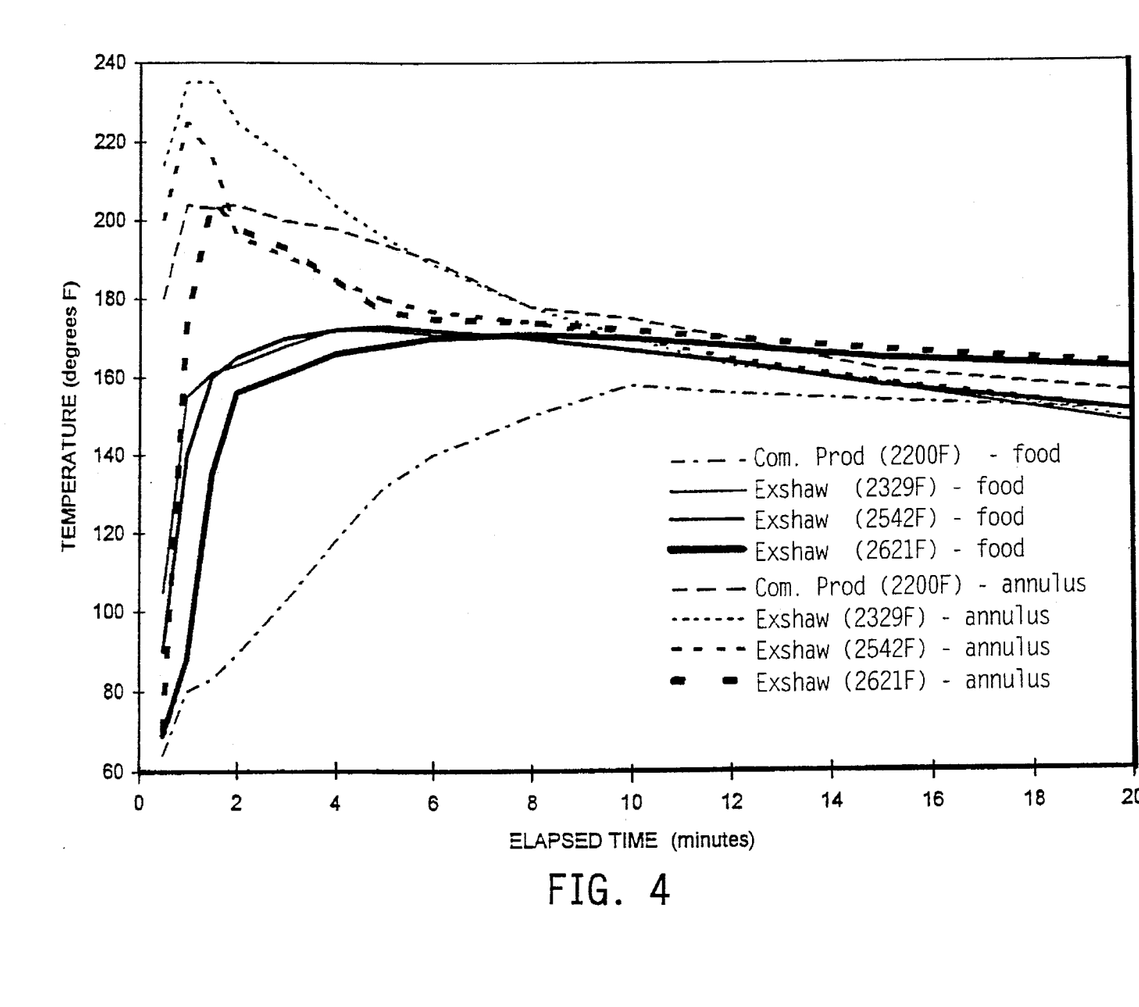
FIG. 4 is a set of curves of temperature change versus time of the temperature of the water (simulating food) in the inner can and the temperature of the annular chamber of the container of Example 1 and containers containing the highly overburned lime Samples 1, 3 and 5 of Example 2.
Figure 5:
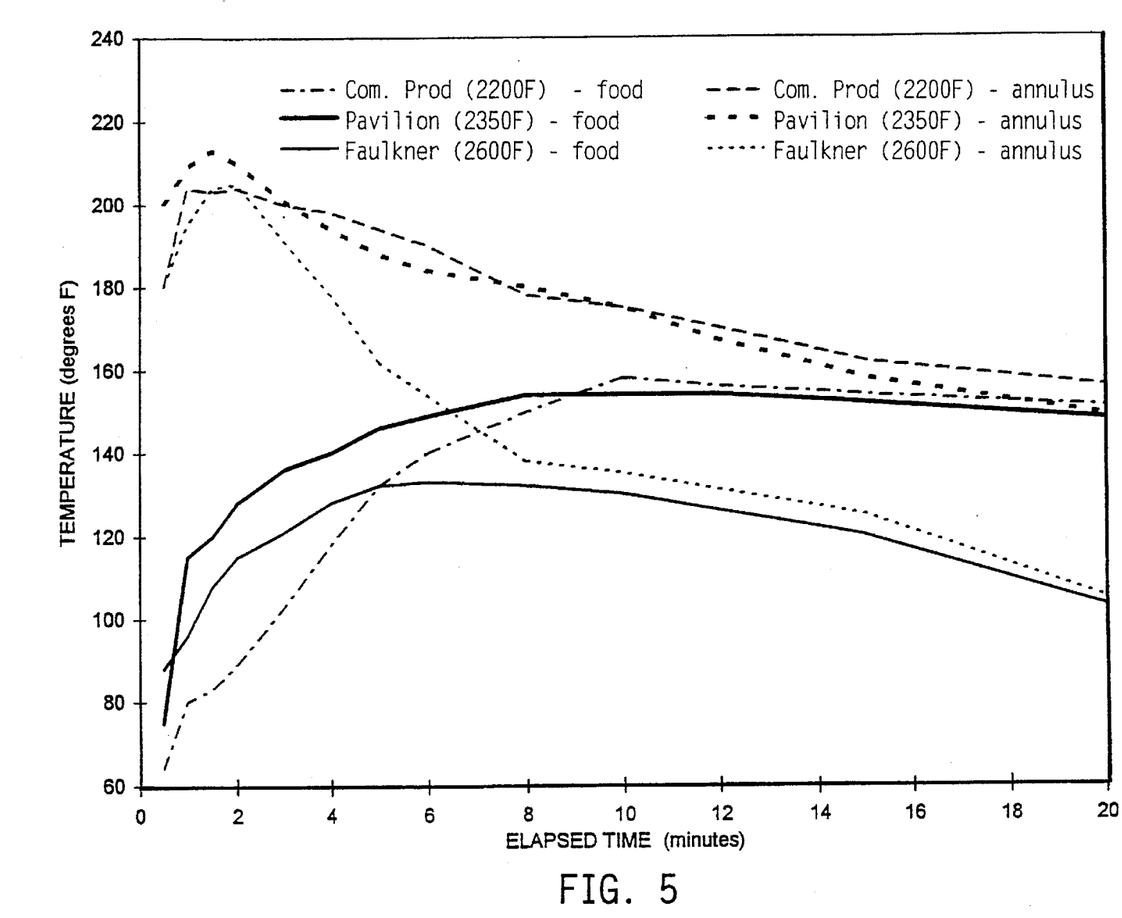
FIG. 5 is set of curves of the temperature change versus time of the temperatures of the water (simulating food) in the inner can and the annular fuel chambers of Example 1 and Samples 2 and 4 of Example 2.

All of the overburned Samples of Example 2, except for Sample 4, unexpectedly exhibited acceptable heating performance and faster warming of the water in the inner can than did Example 1. However, as shown in FIG. 4, the contents of the annular chamber overheated early in the tests with Samples 1 and 3 (Exshaw). The temperature in the annular chamber exceeded boiling for about a minute releasing excessive steam which could be a hazard to the user. However, FIG. 5 demonstrates that Sample 2 (Pavillion) performs satisfactorily and similarly to Example 1. Sample 4 (Faulkner) does not sustain the temperature in the annular chamber for a time sufficient to warm food adequately.

EXAMPLE 3

Figure 6:
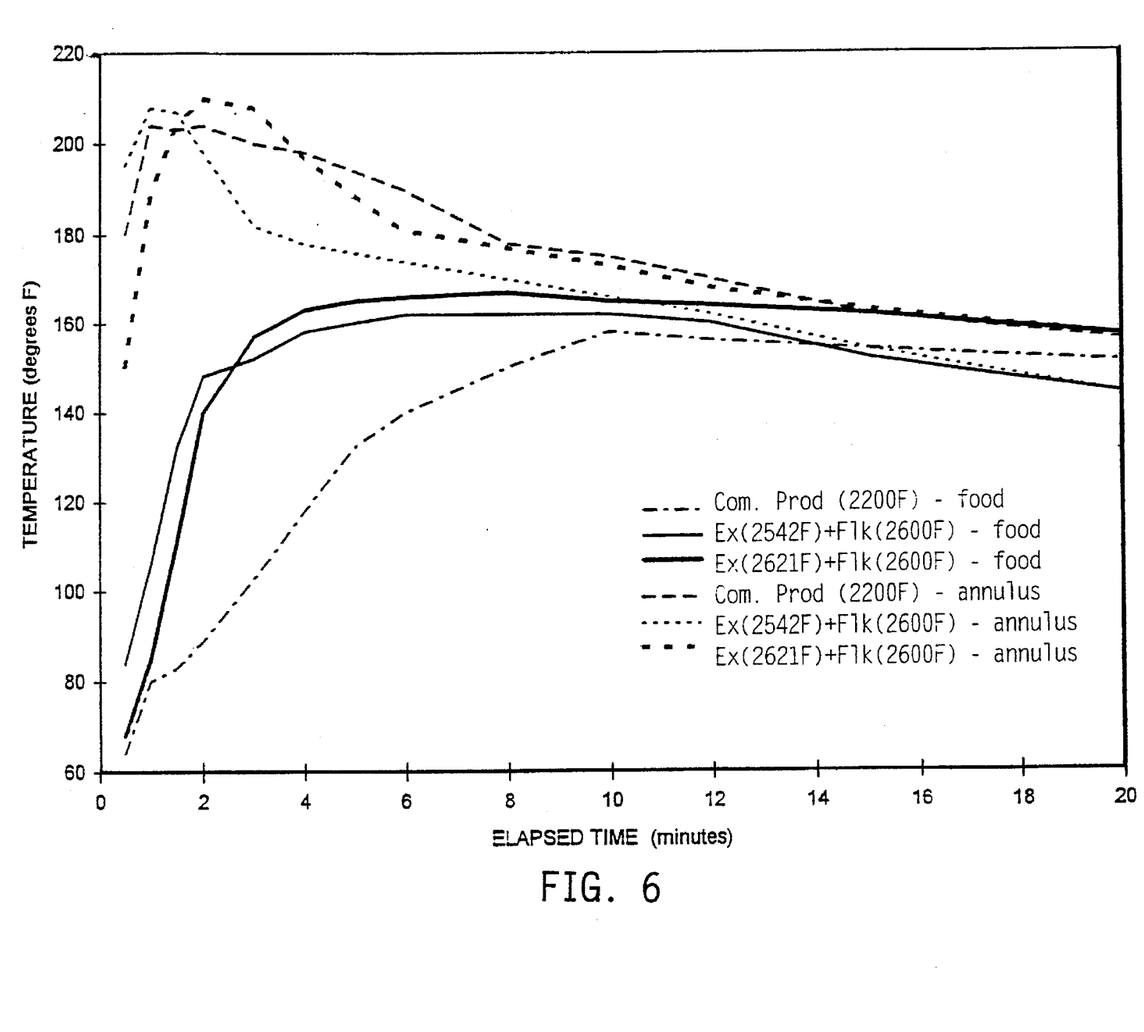
FIG. 6 is a set of inner-can (food) temperature-time curves for the annulus fuel-water mixtures of Example 3.

In two additional tests, a mixture of 125 grams of Sample 4 (Faulkner) quicklime and 30 grams of Sample 3 (Exshaw-2542) or Sample 5 (Exshaw-2621) quicklime were substituted for the quicklime of Example 1. The amount of water and the water-to-lime ratio were the same as Example 1. The performance of these fuel mixtures is shown in FIG. 6. The mixture of a major amount of the hard, dense quicklime calcined at a temperature of over 1,400° C. with a small amount of the quicklimes calcined at temperatures slightly below or above 1,400° C. performed as well as the commercial-product quicklime of Example 1 as shown in FIG. 6. The outer annulus temperature profiles are very similar. The inner can was heated more quickly and sustained temperatures of 160° F. to 140° F. for at least 20 minutes.

Another way to modify the performance of the quicklimes is to add a solid, anhydrous acid that when moistened exothermically reacts with the quicklime to form a neutral salt. As disclosed in copending application entitled ACID-BASE FUELS FOR SELF HEATING FOOD CONTAINERS, filed concurrently herewith, the disclosure of which is expressly incorporated herein by reference, the acid must not be corrosive to the container or the membrane separating the solid reactants from the water.

Excess weight or bulk of the fuel is also a prime consideration. Therefore, solid acids with lower equivalent weights are more advantageous, i.e., solid acids such as oxalic, sulfamic, citric, and tartaric would be favored over such acids as benzoic, trichloroacetic, gluconic, and succinic. Of course, cost and availability are other considerations; but rather impure technical-grade materials can be used. Though the acid could be dissolved in the water, the concentration of acid could reach 8 to 10 normal and again could be quite corrosive or hazardous if it leaked from the containers.

The solid acids must also be anhydrous, i.e., they must not carry waters of hydration or absorbed moisture. Quicklimes are quite hygroscopic. They would slowly dehydrate a solid acid soon after they were mixed and placed in the annular chamber. Heat would be slowly liberated, and a significant portion of the heating capacity of the fuel would be lost while the can was in storage awaiting use.

The anhydrous, granular solid acid can be added to the quicklime in an amount up to an equivalent proportion with respect to the quicklime, usually from 10% to 50% by weight of the mixture. Some water must be added to initiate the reaction but since water is a by-product of the neutralization reaction, less water would be required than for a fuel composition that uses quicklime alone. Also, less weight of the total solid reactants is required to produce the same amount of heat with an acid-base fuel. For example, the slaking of quicklime produces 277 calories per gram of solid fuel. However, an equivalent-proportion mixture of calcium oxide and oxalic acid produces:

$$CaO + H_2C_2O_4 \rightarrow CaC_2O_4 \cdot H_2O + 340 \text{ calories/gram of solid fuel}$$

Thus it can be seen that this acid-base fuel would not only produce innocuous calcium oxalate rather than hazardous calcium hydroxide, it would also produce more heat on a weight basis. Therefore, less fuel by weight could be used to produce the same heating effect.

EXAMPLE 4

Figure 7:
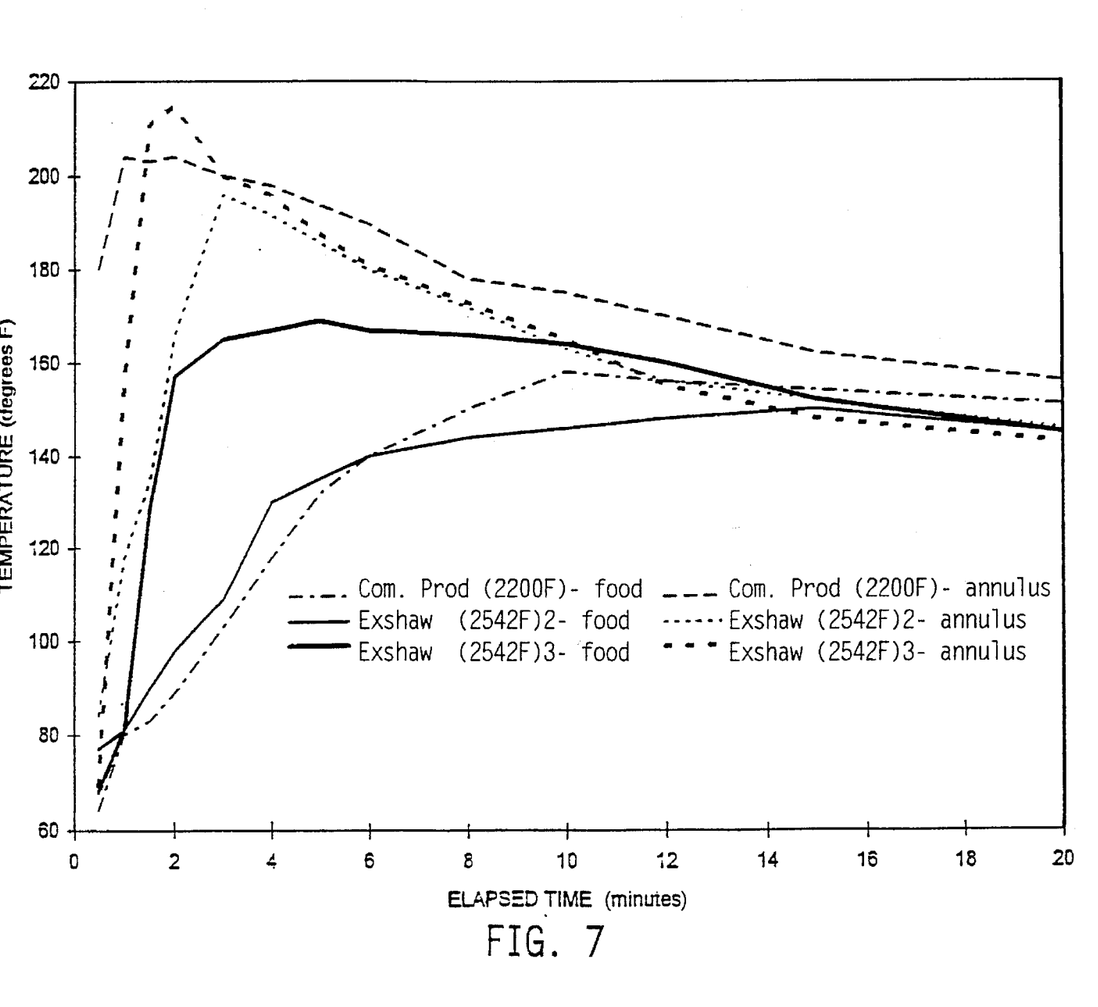
FIG. 7 is a set of inner-can (food) and annulus temperature-time curves for the annulus fuel-water mixtures of Example 4.

A fuel mixture was prepared from 43 grams of the quicklime of Sample 3, an equivalent portion (75 grams) of oxalic acid and 137 grams of water. The water-to-lime ratio was 3.18 and the water-to-fuel ratio was 0.86. The total weight of reactants was 255 grams, the same as the commercial product of Example 1. As shown in FIG. 7, the heating performance again closely followed that of the lime-water mixture of the commercial product. The post-test annular chamber contained solid calcium oxalate and some excess water. The pH of the slurry was near neutral. Calcium oxalate is not toxic nor hazardous. The excess water can readily be eliminated by reducing the amount of water in the annular bag.

EXAMPLE 5

The experiment of Example 4 was repeated by reducing the water in the annular bag to 120 grams. The equivalent mixture of lime and oxalic acid were increased to maintain the total reactants at 255 grams. The results are also shown in FIG. 7. The water simulating food in the inner container was heated in a shorter time to a higher temperature (about 160° F.). The temperature was sustained above 140° C. for at least 20 minutes. There was no excess water in the annulus after the test.

EXAMPLE 6

The experiment of Example 5 was repeated substituting 43 grams of the Exshaw-2621 quicklime of Sample 5 for the Exshaw-2542 quicklime of Sample 3. The heating rate was only very slightly below that of Example 5 and is considered to be satisfactory for a commercial product.

It is to be realized that only preferred embodiments of the invention have been described and that numerous substitutions, modifications and alterations are permissible without departing from the spirit and scope of the invention as defined in the following claims.

I claim:

1. A fuel for a self-heating food container which includes a compartment having two chambers separated by a water-impermeable barrier film comprising:

a first chamber containing water; and a second chamber containing a hydratable exothermic fuel consisting essentially of a major amount of hard, particles of crystalline quicklime that have been calcined at a temperature above 1,400° C.

2. A fuel according to claim 1 in which the quicklime has been calcined at a temperature from 1,410° C. to 1,500° C.

3. A fuel according to claim 1 in which the weight ratio of water to quicklime is less than 0.7/1.

4. A fuel according to claim 3 in which the ratio of water to quicklime is from 0.3 to 0.67.

5. A fuel according to claim 1 in which the particles are from 0.1 to 10 mm in diameter.

6. A fuel according to claim 5 in which the particles are from 0.5 to 5 mm in diameter.

7. A fuel according to claim 1, in which said fuel further includes at least 10% by weight based on said hard particles of softer, more porous particles of quicklime calcined at a temperature of at least 1,250° C.

8. A fuel for a self-heating food container which includes a compartment containing two chambers separated by a water-impermeable barrier film comprising:

a first chamber containing water; and a second chamber containing particles of quicklime that has been calcined at a temperature above 1,400° C. and at least 10% by weight based on the quicklime of a solid, anhydrous acid that when hydrated with water exothermically reacts with the quicklime and produces a non-toxic, non-hazardous salt.

9. A fuel according to claim 8 in which the acid is a weak organic acid.

10. A fuel according to claim 9 in which the acid is selected from the group consisting of oxalic acid, sulfamic acid, citric acid and tartaric acid.

11. A self-heating, food container comprising in combination:

a first closed container for receiving the food to be heated;

a second container surrounding the first container forming an annular chamber divided by a water impermeable film into an upper compartment and a lower compartment; and body of hydratable fuel consisting essentially of a major amount of hard particles of crystalline quicklime calcined at a temperature above 1,400° C. received in the lower compartment; and a body of water received in the upper compartment.

12. A container according to claim 11 in which the lower compartment also contains at least 10% based on the weight of the hard particles of softer, more porous particles of quicklime calcined at a temperature above 1,250° C.

13. A self-heating, food container comprising in combination:
- a first closed container for receiving the food to be heated;
- a second container surrounding the first container forming an annular chamber divided by a water impermeable film into an upper compartment and a lower compartment; and
- a body of hydratable fuel consisting essentially of a major amount of hard particles of crystalline quicklime calcined at a temperature above 1,400° C., at least 10% based on weight of the hard particles of a solid anhydrous, weak acid that exothermically reacts with said quicklime received in the lower compartment.

14. A container according to claim 13 in which the acid is oxalic acid.

15. A self-heating food container according to claim 11 in which the hard, crystalline quicklime is calcined at a temperature from 1,410° C. to 1,500° C.

16. A self-heating food container according to claim 15 in which the fuel further includes at least 10% by weight based on said hard particles of softer, more porous particles of quicklime calcined at a temperature of at least 1,250° C.

* * * * *